(12) United States Patent
Ohzawa

(10) Patent No.: US 6,480,338 B1
(45) Date of Patent: Nov. 12, 2002

(54) EYEPIECE OPTICAL SYSTEM AND IMAGE DISPLAY APPARATUS

(75) Inventor: Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 78 days.

(21) Appl. No.: 09/706,743

(22) Filed: Nov. 7, 2000

(30) Foreign Application Priority Data

Nov. 16, 1999 (JP) ............................................. 11-325662

(51) Int. Cl.⁷ ........................... G02B 25/00; G02B 17/00
(52) U.S. Cl. ....................................... 359/646; 359/727
(58) Field of Search ................................. 359/643, 644, 359/645, 646, 647, 633, 726, 727

(56) References Cited

U.S. PATENT DOCUMENTS

| | | | |
|---|---|---|---|
| 3,443,858 A | 5/1969 | Russa | |
| 5,517,366 A | 5/1996 | Togino | 359/726 |
| 5,654,828 A | 8/1997 | Togino et al. | 359/633 |
| 5,768,039 A | 6/1998 | Togino | 359/726 |

Primary Examiner—Scott J. Sugarman
(74) Attorney, Agent, or Firm—Burns, Doane, Swecker & Mathis, LLP (57) ABSTRACT

An eyepiece optical system for projecting an enlarged virtual image of a two-dimensional image on an observer's pupil has a first reflective/transmissive surface formed as a flat surface, a second reflective/transmissive surface so shaped as to be concave to the pupil side, and a negative-powered optical element having a negative power and arranged between the second reflective/transmissive surface and the two-dimensional image. Here the focal length of the negative-powered optical element f2 and the focal length of the entire eyepiece optical system fs are so determined as to fulfill the following condition:

$-1.0 < fs/f2 < -0.1.$

28 Claims, 5 Drawing Sheets

SPHERICAL ABERRATION / SINE CONDITION

FIG.4B
ASTIGMATISM

FIG.4C
DISTORTION %

EYEPIECE OPTICAL SYSTEM AND IMAGE DISPLAY APPARATUS

This application is based on application No. H11-325662 filed in Japan on Nov. 16, 1999, the entire contents of which are hereby incorporated by reference.

BACKGROUND OF THE INVENTION

1. Field of the Invention

The present invention relates to an eyepiece optical system and an image display apparatus, and particularly to an eyepiece optical system that permits a two-dimensional image displayed on an image display device such as an LCD (liquid crystal display) to be enlarged and projected on an observer's pupil so as to permit the observer to observe a virtual image of the two-dimensional image, and to an image display apparatus such as an HMD (head mounted display) employing such an eyepiece optical system.

2. Description of the Prior Art

Conventionally, several eyepiece optical systems having a so-called pancake-like structure have been proposed that employ a reflective/transmissive surface to permit observation of an enlarged image of a flat two-dimensional image. For example, U.S. Pat. No. 3,443,858 discloses an eyepiece optical system having a flat reflective/transmissive surface and a reflective/transmissive surface concave to the pupil side. U.S. Pat. No. 5,517,366 and U.S. Pat. No. 5,768,039 disclose an eyepiece optical system having two reflective/transmissive surfaces highly concave to the pupil side. U.S. Pat. No. 5,654,828 discloses an optical system in which a pancake-like structure and a lens are combined together. On the other hand, in recent years, image display devices for displaying two-dimensional images have rapidly been coming to have increasingly high pixel densities. For example, many models of LCDs are being put into practical use that are of sizes much smaller than one inch but that nevertheless offer high resolution.

However, with the simple combination of reflective/transmissive surfaces as disclosed in U.S. Pat. No. 3,443,858, when a small image display device is used, it is difficult to obtain a wide angle of view while maintaining a sufficient eye relief. The combination of reflective/transmissive surfaces as disclosed in U.S. Pat. No. 5,517,366 and U.S. Pat. No. 5,768,039 offers a wide angle of view; however, in this construction, it is difficult to form a wave plate or a cholesteric liquid crystal surface on the reflective/transmissive surfaces in order to eliminate direct light by exploiting polarization, because both of the reflective/transmissive surfaces are formed as curved surfaces. In addition, because the surface at the pupil side end is concave to the pupil side, it is difficult to obtain a sufficient eye relief. In the case of the optical system proposed in U.S. Pat. No. 5,654,828, because a positive or weakly negative lens is arranged on the image display device side thereof, it is difficult to cope with a small image display device while keeping rays telecentric toward the image display device.

SUMMARY OF THE INVENTION

An object of the present invention is to provide an eyepiece optical system that can cope with miniaturization of image display devices and that can display high-resolution images, and to provide an image display apparatus employing such an eyepiece optical system.

To achieve the above object, according to one aspect of the present invention, an eyepiece optical system for projecting an enlarged virtual image of a two-dimensional image on the observer's pupil is provided with, from the observer's pupil side: a first reflective/transmissive surface formed as a flat surface; a second reflective/transmissive surface so shaped as to be concave to the pupil side; and a negative-powered optical element having a negative power and arranged between the second reflective/transmissive surface and the two-dimensional image. Here the following condition is fulfilled:

$$-1.0 < fs/f2 < -0.1$$

where f2 represents a focal length of the negative-powered optical element; and fs represents a focal length of the entire eyepiece optical system.

According to another aspect of the present invention, an image display apparatus is provided with: an image display device for displaying a two-dimensional image; and an eyepiece optical system for projecting an enlarged virtual image of the two-dimensional image on the observer's pupil, the eyepiece optical system comprising, from the observer's pupil side: a first reflective/transmissive surface formed as a flat surface; a second reflective/transmissive surface so shaped as to be concave to the pupil side; and a negative-powered optical element having a negative power and arranged between the second reflective/transmissive surface and the two-dimensional image. Here the eyepiece optical system fulfills the following condition:

$$-1.0 < fs/f2 < -0.1$$

where f2 represents a focal length of the negative-powered optical element; and fs represents a focal length of the entire eyepiece optical system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
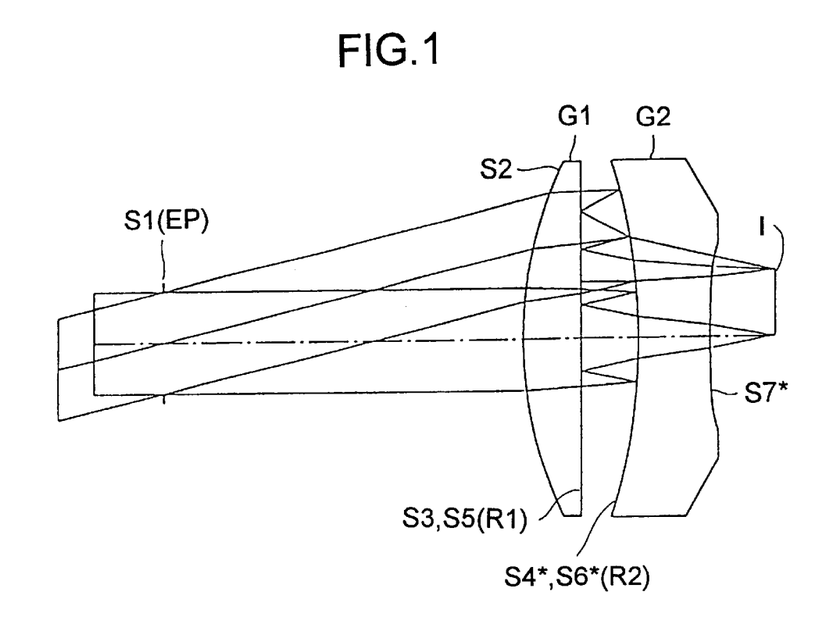
FIG. 1 is an optical construction diagram of a first embodiment (Example 1) of the invention.
Figure 3:
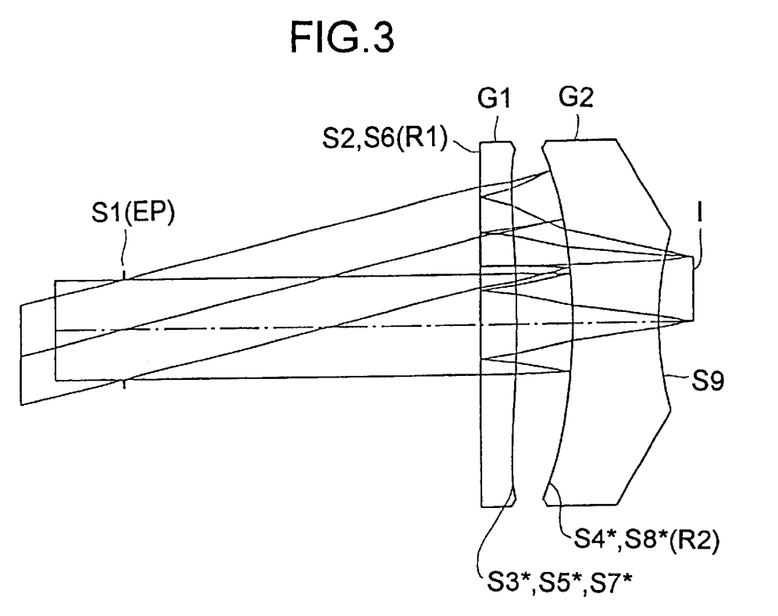
FIG. 3 is an optical construction diagram of a second embodiment (Example 2) of the invention.
Figure 5:
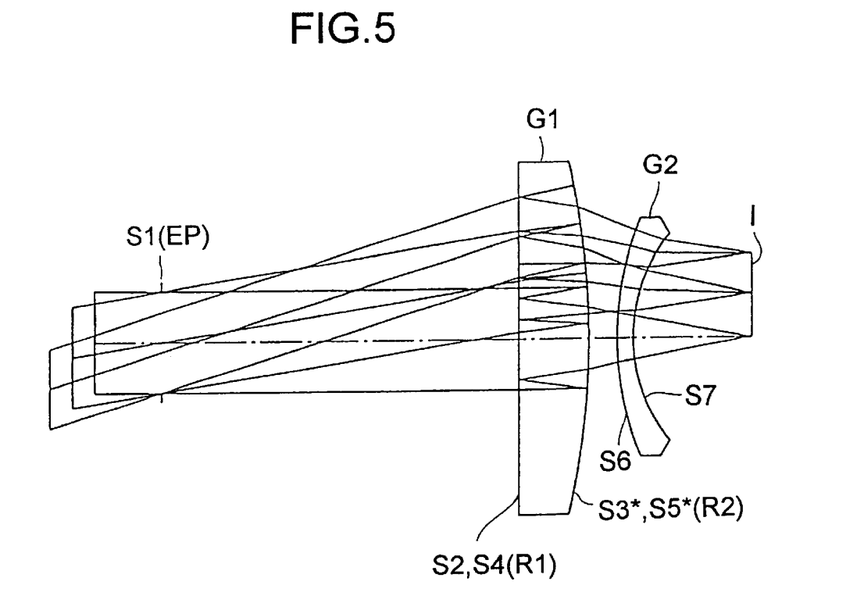
FIG. 5 is an optical construction diagram of a third embodiment (Example 3) of the invention.
Figure 7:
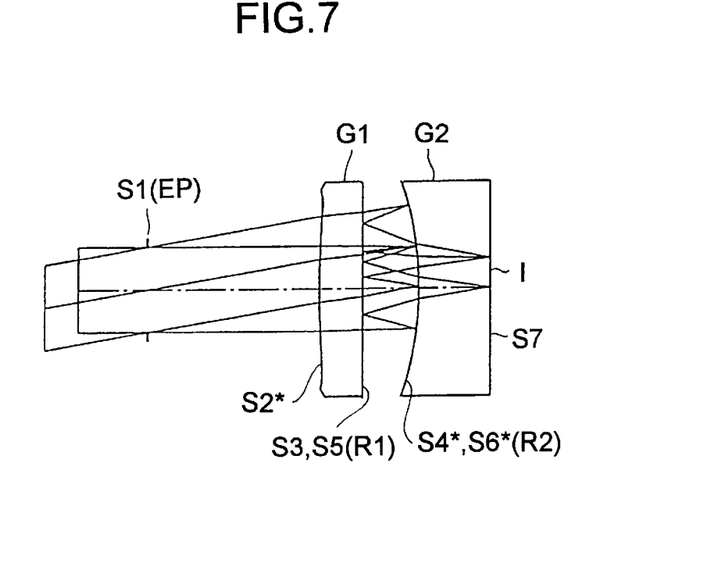
FIG. 7 is an optical construction diagram of a fourth embodiment (Example 4) of the invention.
Figure 9:
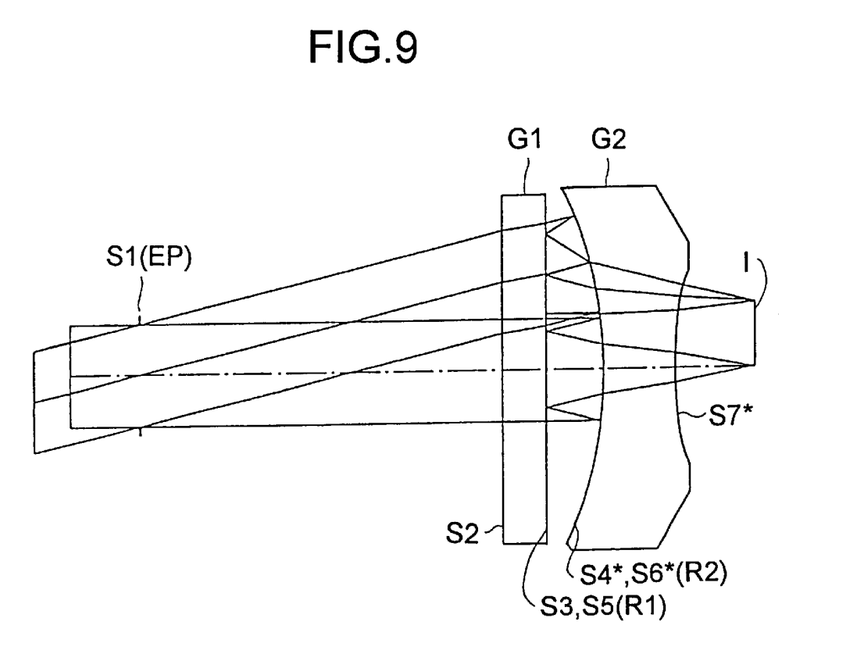
FIG. 9 is an optical construction diagram of a fifth embodiment (Example 5) of the invention.

Hereinafter, eyepiece optical systems and image display apparatuses embodying the present invention will be described with reference to the drawings. FIGS. 1, 3, 5, 7, and 9 are optical construction diagrams of a first to a fifth embodiment, respectively, of the invention. In each optical construction diagram, (I) represents a two-dimensional image, which corresponds to the display screen of an image display device such as an LCD that displays the two-dimensional image (I), that is, it corresponds to the image plane of the eyepiece optical system when considered as an image formation system. In each diagram, Si (i=1, 2, 3, . . . ) represents the i-th surface from the pupil (EP) side, inclusive to the pupil (EP). A surface marked with an asterisk (*) is an aspherical surface.

The image display apparatus of each embodiment is composed of an image display device for displaying a two-dimensional image (I) and an eyepiece optical system for projecting an enlarged virtual image of the two-dimensional image (I) on the observer's pupil (EP). The eyepiece optical system is composed of, from the observer's pupil (EP) side, a first optical element (G1) and a second optical element (G2). Moreover, this eyepiece optical system includes, from the observer's pupil (EP) side, a first reflective/transmissive surface (R1) and a second reflective/transmissive surface (R2) concave to the observer's pupil (EP) side. The second optical element (G2) has a negative power and is arranged on the two-dimensional image (I) side of the second reflective/transmissive surface (R2).

As the image display device, a liquid crystal display device is used. When a transmission-type liquid crystal display device is used, the display portion thereof is illuminated from behind by illumination light emitted from an illumination optical system so designed, and the illumination light is modulated by the two-dimensional image (I) displayed on the liquid crystal display device. When a reflection-type liquid crystal display device is used, the display portion thereof is illuminated from the front by illumination light emitted from an illumination optical system so designed, and the illumination light is modulated by the two-dimensional image (I) displayed on the liquid crystal display device. In this case, the display portion can be illuminated from the front, for example, by directing illumination light thereto through a well-known total internal reflection prism (TIR).

In the first embodiment (FIG. 1), the first optical element (G1) is a positive plano-convex lens element convex to the pupil (EP) side and the second optical element (G2) is a negative biconcave lens element having aspherical surfaces on both sides. The two-dimensional image (I) side surface of the first optical element (G1) is designed to serve as the first reflective/transmissive surface (R1), and the pupil (EP) side surface of the second optical element (G2) is designed to serve as the second reflective/transmissive surface (R2).

In the second embodiment (FIG. 3), the first optical element (G1) is a positive plano-convex lens element convex to the two-dimensional image (I) side and having an aspherical surface on the two-dimensional image (I) side, and the second optical element (G2) is a negative biconcave lens element having an aspherical surface on the pupil (EP) side. The pupil (EP) side surface of the first optical element (G1) is designed to serve as the first reflective/transmissive surface (R1), and the pupil (EP) side surface of the second optical element (G2) is designed to serve as the second reflective/transmissive surface (R2).

In the third embodiment (FIG. 5), the first optical element (G1) is a positive plano-convex lens element convex to the two-dimensional image (I) side and having an aspherical surface on the two-dimensional image (I) side, and the second optical element (G2) is a negative meniscus lens element concave to the two-dimensional image (I) side. The pupil (EP) side surface of the first optical element (G1) is designed to serve as the first reflective/transmissive surface (R1), and the two-dimensional image (I) side surface of the first optical element (G1) is designed to serve as the second reflective/transmissive surface (R2).

In the fourth embodiment (FIG. 7), the first optical element (G1) is a positive plano-convex lens element convex to the pupil (EP) side and having an aspherical surface on the pupil (EP) side, and the second optical element (G2) is a negative plano-concave lens element concave to the pupil (EP) side and having an aspherical surface on the pupil (EP) side. The two-dimensional image (I) side surface of the first optical element (G1) is designed to serve as the first reflective/transmissive surface (R1), and the pupil (EP) side surface of the second optical element (G2) is designed to serve as the second reflective/transmissive surface (R2).

In the fifth embodiment (FIG. 9), the first optical element (G1) is a flat plate and the second optical element (G2) is a negative biconcave lens element having aspherical surfaces on both sides. The two-dimensional image (I) side surface of the first optical element (G1) is designed to serve as the first reflective/transmissive surface (R1), and the pupil (EP) side surface of the second optical element (G2) is designed to serve as the second reflective/transmissive surface (R2).

In the eyepiece optical systems of these embodiments, all having a pancake-like structure, by arranging the second optical element (G2) having a strong negative power on the two-dimensional image (I) side thereof, it is possible to obtain satisfactory optical performance even with a small and high-resolution image display device. Thus, it is possible to cope with miniaturization of image display devices and display high-resolution images. In addition, it is possible to realize a construction telecentric toward the image display device while keeping a sufficient eye relief and a wide angle of view.

From the viewpoint of the above-mentioned negative power, it is preferable that the following condition (1) be fulfilled:

$$-1.0 < fs/f2 < -0.1 \tag{1}$$

where f2 represents the focal length of the negative-powered second optical element (G2); and fs represents the focal length of the eyepiece optical system.

Condition (1) defines the desirable negative power of the second optical element (G2) arranged on the two-dimensional image (I) side of the eyepiece optical system. If the upper limit of condition (1) is transgressed, the negative power of the second optical element (G2) becomes too weak, and this makes it difficult to realize a construction telecentric toward a small image display device. If the lower limit of condition (1) is transgressed, the negative power of the second optical element (G2) becomes too strong, and this makes it difficult to correct the curvature of field occurring in the second optical element (G2).

Regarding the above-mentioned negative power of the second optical element (G2), it is more preferable that the following condition (1') be fulfilled:

$$-0.8 < fs/f2 < -0.2 \tag{1'}$$

If the upper limit of condition (1') is transgressed, it becomes necessary to secure a long distance from the two-dimensional image (I) to the second reflective/transmissive surface (R2). Securing a long distance from the two-dimensional image (I) to the second reflective/transmissive surface (R2) requires the eyepiece optical system to be made thicker and thus less compact. If the lower limit of condition (1') is transgressed, it becomes difficult to correct the chromatic aberration occurring in the negative-powered second optical element (G2).

Moreover, it is preferable that the second reflective/transmissive surface (R2) fulfill the following condition (2):

$$-4.0 < CRs/fs < -0.8 \quad (2)$$

where

CRs represents the radius of curvature of the second reflective/transmissive surface (R2); and fs represents the focal length of the eyepiece optical system.

Condition (2) defines the desirable radius of curvature of the second reflective/transmissive surface (R2). If the lower limit of condition (2) is transgressed, the power of concave-surface reflection becomes too weak, and this makes it difficult to give the entire eyepiece optical system a desired power. In addition, it becomes necessary to weaken the negative power of the second optical element (G2) disposed on the two-dimensional image (I) side of the eyepiece optical system, and this makes it difficult to cope with a small image display device. If the upper limit of condition (2) is transgressed, the power of concave-surface reflection becomes unduly strong, and this makes it difficult to correct the curvature of field resulting from concave-surface reflection.

As in the first to fourth embodiments, it is preferable that the positive-powered first optical element (G1) be arranged nearest to the pupil (PE). And it is more preferable that this positive-powered optical element (G1) arranged nearest to the pupil (EP) fulfill the following condition (3):

$$0 \leq fs/f1 < 1.0 \quad (3)$$

where f1 represents the focal length of the positive-powered first optical element (G1); and fs represents the focal length of the eyepiece optical system.

Condition (3) defines the desirable positive power of the first optical element (G1) arranged nearest to the pupil (EP). If the lower limit of condition (3) is transgressed, it is difficult to cancel the curvature of field resulting from concave-surface reflection. If the upper limit of condition (3) is transgressed, too much positive power concentrates on the first optical element (G1) and this makes it difficult to correct the chromatic aberration occurring in the positive-powered first optical element (G1).

Regarding the positive power of the first optical element (G1), it is more preferable that the following condition (3') be fulfilled:

$$0.2 \leq fs/f1 < 0.7 \quad (3')$$

If the lower limit of condition (3') is transgressed, the principal point of the eyepiece optical system is too far away from the pupil (EP) and this makes it difficult to secure a sufficient eye relief. If the upper limit of condition (3') is transgressed, too much positive power concentrates on the first optical element (G1) and this makes it difficult to secure a sufficient back focal length to the two-dimensional image (I).

It is preferable that the negative-powered second optical element (G2) arranged on the two-dimensional image (I) side of the second reflective/transmissive surface (R2) fulfil the following condition (4):

$$\nu d < 35 \quad (4)$$

where $\nu d$ represents the Abbe number of the negative-powered second optical element (G2).

Condition (4) defines the desirable dispersive power of the negative-powered second optical element (G2). If the upper limit of condition (4) is transgressed, it is difficult to sufficiently cancel the chromatic aberration occurring in the pupil (PE) side, positive-powered first optical element (G1) with the negative-powered second optical element (G2).

As in the first to fifth embodiments, it is preferable that the first reflective/transmissive surface (R1) be formed as a flat surface. This construction makes it possible to give the first reflective/transmissive surface (R1) a selectively reflecting property simply by laying over that flat surface a special film, such as one made of cholesteric liquid crystal, having a polarization selecting property, and is thus advantageous from the viewpoint of mass-productibility and costs.

As in the first, second, fourth, and fifth embodiments, it is preferable that the second reflective/transmissive surface (R2) be formed as a part of the negative-powered second optical element (G2). Forming the second reflective/transmissive surface (R2) as a part of the negative-powered second optical element (G2) arranged on the two-dimensional image (I) side of the second reflective/transmissive surface (R2) makes it possible to reduce the number of optical components needed and thereby make the eyepiece optical system compact and inexpensive.

As in the first to fifth embodiments, it is preferable that the first reflective/transmissive surface (R1) be formed as a part of the positive-powered first optical element (G1). Forming the first reflective/transmissive surface (R1) as a part of the positive-powered first optical element (G1) arranged nearest to the pupil (EP) makes it possible to reduce the number of optical components needed and thereby make the eyepiece optical system compact and inexpensive.

In the first to fifth embodiments, the second reflective/transmissive surface (R2) is formed as a concave reflective surface having an aspherical shape. It is preferable that the concave reflective surface be formed as an aspherical surface. Forming the concave reflective surface as an aspherical surface makes it possible to reduce the curvature of field occurring in the eyepiece optical system and thus obtain a wider angle of view.

Moreover, it is also preferable that, as in the first to fifth embodiments, the eyepiece optical system be composed of two optical blocks. Forming the eyepiece optical system out of two optical blocks helps make it compact. It is more preferable that all the optical blocks of the eyepiece optical system be composed of plastic lens elements. Using plastic lens elements helps realize a light and inexpensive eyepiece optical system.

Practical Examples

Now, practical examples of eyepiece optical systems according to the present invention will be described in more detail with reference to their construction data and the like. Examples 1 to 5 described below correspond respectively to the first to fifth embodiments described above. The optical construction diagrams (FIGS. 1, 3, 5, 7, and 9) of the first to fifth embodiments show the optical constructions of Examples 1 to 5, respectively. Tables 1 to 5 list the construction data, of Examples 1 to 5, respectively. In the construction data of each example, Si (i=1, 2, 3, . . . ) represents the i-th surface of the whole system including the pupil (EP) as counted from the pupil (EP) side along the optical path, and ri (i=1, 2, 3, . . . ) represents the radius of curvature (mm) of the surface Si. Moreover, di (I=1, 2, 3, . . . ) represents the i-th axial distance (mm) of the whole system including the pupil (EP) as counted from the pupil (EP) side along the optical path, and Ni (i=1, 2, 3, . . . ) and vi (i=1, 2, 3, . . . ) respectively represent the refractive index for the d line and the Abbe number of the i-th optical element as counted from the pupil (EP) side along the optical path. Listed together are the diameter of the pupil (EP) and the angle of view. Table 6 lists the actual values of conditions (1) to (4) as observed in each example and related data.

A surface Si marked with an asterisk (*) is an aspherical surface, of which the surface shape is defined by formula (AS) below. The aspherical surface data of each aspherical surface is also listed together with other data.

$$Z(H)=(C0 \cdot H^2)/\{1+\sqrt{(1-\epsilon \cdot C0^2 \cdot H^2)}\}+(A\ 4 \cdot H^4+A6 \cdot H^6+A8 \cdot H^8+A10 \cdot H^{10}) \quad (AS)$$

where

Z(H) represents the displacement along the optical axis at the height H (with respect to the vertex of the surface);

H represents the height in a direction perpendicular to the optical axis;

C0 represents the paraxial curvature;

ε represents the quadric surface parameter; and

Ai represents the aspherical coefficient of order i (i=4, 6, 8, 10).

Figure 2A:
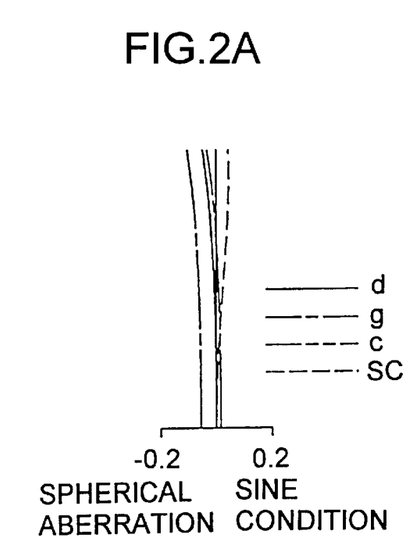
FIGS. 2A to 2C are diagrams showing the aberrations observed in Example 1.
Figure 2B:
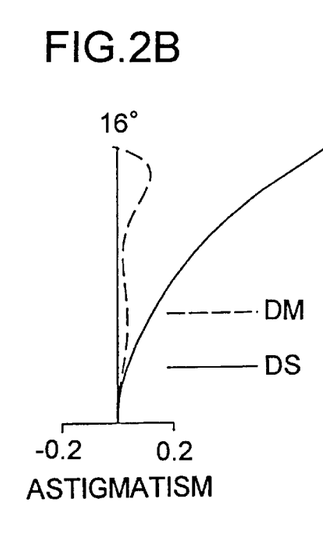
Figure 2C:
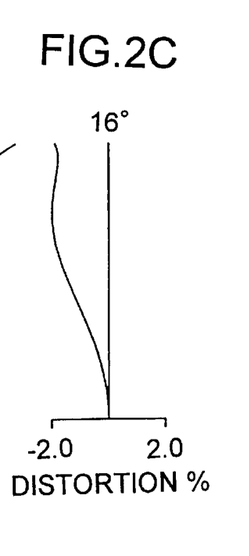
Figure 4A:
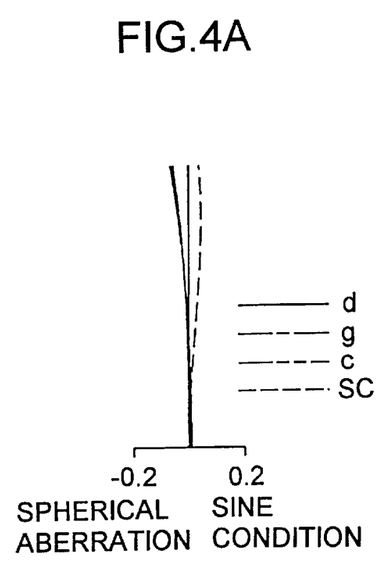
FIGS. 4A to 4C are diagrams showing the aberrations observed in Example 2.
Figures 4B, 4C:
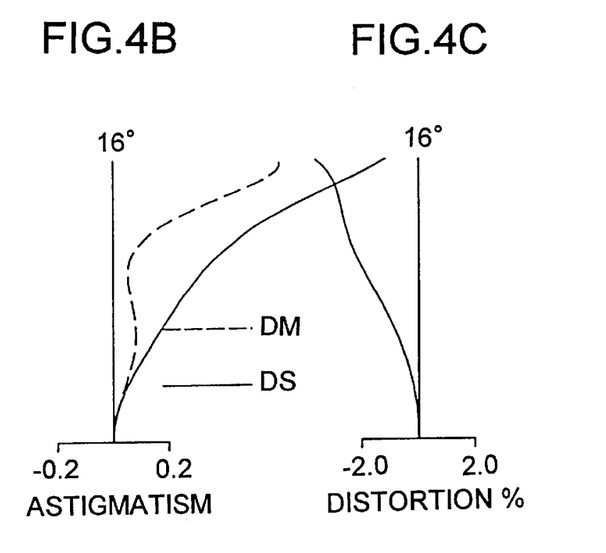
Figure 6A:
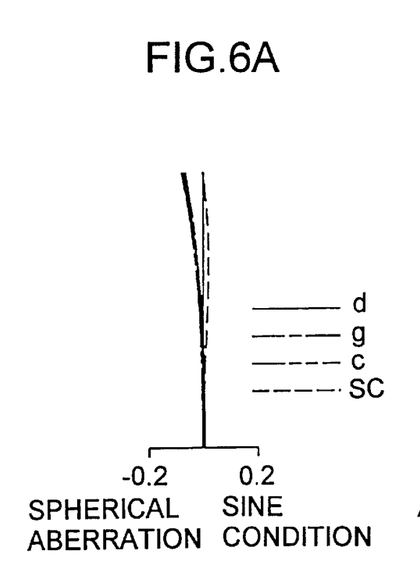
FIGS. 6A to 6C are diagrams showing the aberrations observed in Example 3.
Figure 6B:
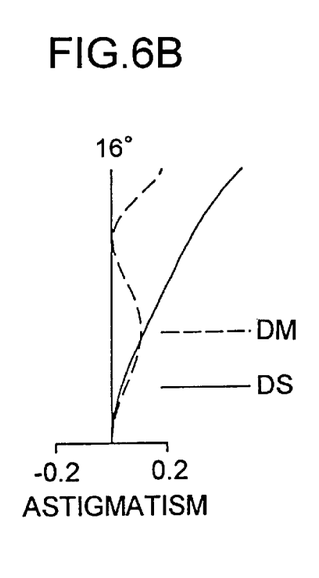
Figure 6C:
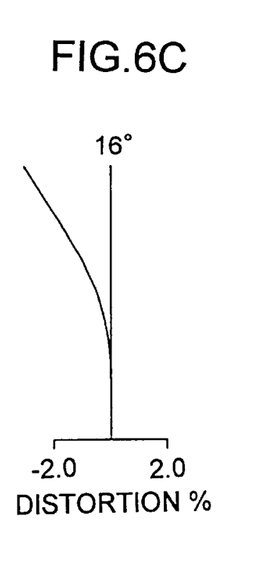
Figure 8A:
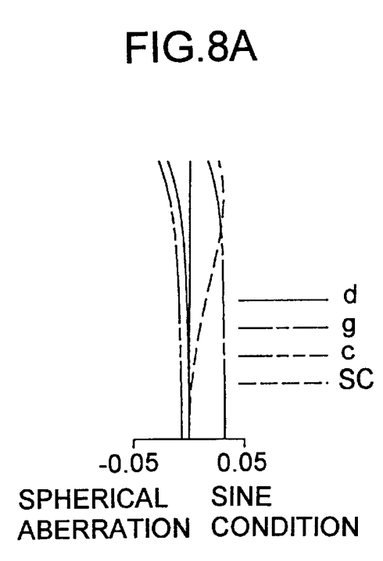
FIGS. 8A to 8C are diagrams showing the aberrations observed in Example 4.
Figure 8B:
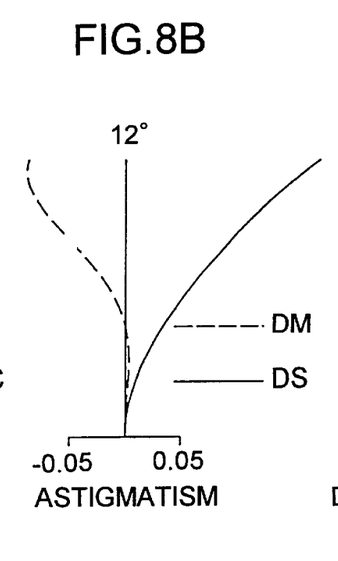
Figure 8C:
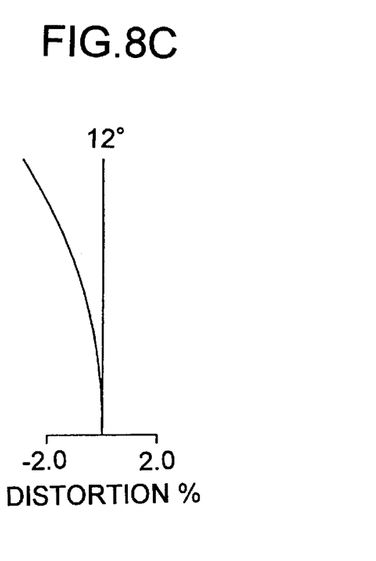
Figure 10A:
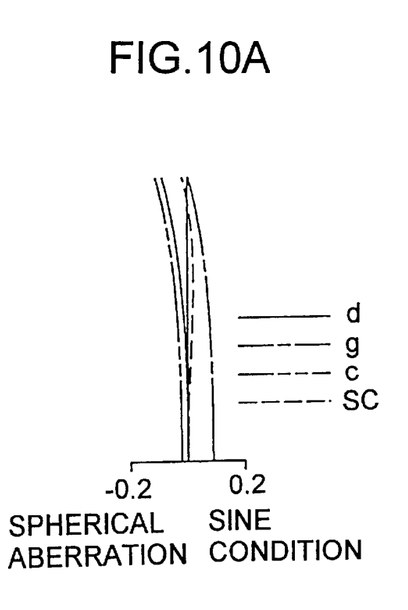
FIGS. 10A to 10C are diagrams showing the aberrations observed in Example 5.
Figure 10B:
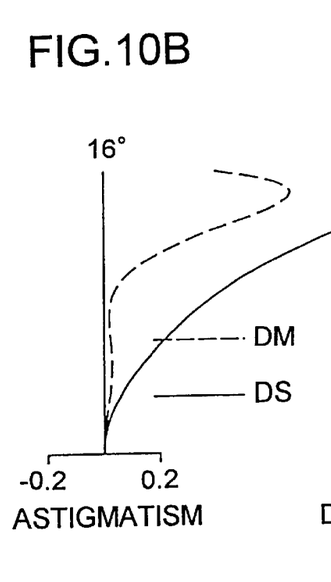
Figure 10C:
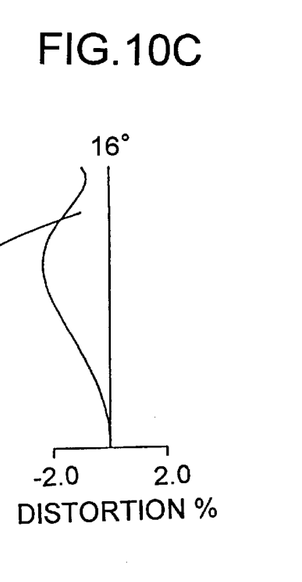

FIGS. 2A–2C, 4A–4C, 6A–6C, 8A–8C, and 10A–10C are diagrams showing the aberrations observed in Examples 1 to 5, respectively. Of these diagrams, FIGS. 2A, 4A, 6A, 8A and 10A are diagrams showing aspherical aberration, FIGS. 2B, 4B, 6B, 8B and 10B are diagrams showing astigmatism (curvature of field), and FIGS. 2C, 4C, 6C, 8C, and 10C are diagrams showing distortion. In the diagrams showing spherical aberration, the axis of ordinate represents the height of incidence on the pupil (EP) (the maximum height equals the radius of the pupil), and the axis of abscissa represents the deviation (mm) from the paraxial focal point along the optical axis, with the solid line (d) representing the spherical aberration for the d line, the dash-and-dot line (g) representing the spherical aberration for the g line, the dash-dot-dot line (c) representing the spherical aberration for the c line, and the broken line (SC) representing the sin condition. In the diagrams showing astigmatism, the axis of ordinate represents the half angle of view (°) and the axis of abscissa represents the deviation (mm) from the paraxial focal point along the optical axis, with the broken line (DM) representing the astigmatism for the d line as observed on the meridional plane, and the solid line (DS) representing the astigmatism for the d line as observed on the sagittal plane. In the diagrams showing distortion, the axis of ordinate represents the half angle of view (°) and the axis of abscissa represents the amount (%) of distortion for the d line. In reality, the two-dimensional image (I) constitutes the object plane; however, here, according to the design conventions of an eyepiece optical system, optical performance is evaluated at the position of the two-dimensional image (I).

As described above, according to the present invention, in an eyepiece optical system, an optical element having an adequate negative power is arranged on the two-dimensional image side of a second reflective/transmissive surface. This makes it possible to cope with miniaturization of image display devices and display high-resolution images. In addition, it is possible to obtain a wide angle of view while keeping the eyepiece optical system compact and a securing a sufficient eye relief.

TABLE 1

<<Example 1>>
Diameter of Pupil = φ7 (mm), Angle of View = 32(°)

| Surface | Radius of Curvature | Axial Distance | Refractive Index | Abbe Number |
|---|---|---|---|---|
| S1 (EP) | r1 = ∞ | | | |
| | | d1 = 25.000 | | |
| S2 | r2 = 27.802 | | | |
| | | d2 = 4.000 | N1 = 1.49140 | υ1 = 57.82 |
| S3 (R1) | r3 = ∞ | . . . (Transmissive) | | |
| | | d3 = 4.000 | | |
| S4 (R2)* | r4 = −41.760 | . . . (Reflective) | | |
| | | d4 = −4.000 | | |
| S5 (R1) | r5 = ∞ | . . . (Reflective) | | |
| | | d5 = 4.000 | | |
| S6 (R2)* | r6 = −41.760 | . . . (Transmissive) | | |
| | | d6 = 5.000 | N2 = 1.58340 | υ2 = 30.23 |
| S7* | r7 = 81.246 | | | |

[Aspherical Surface Data of the Fourth Surface (S4) and the Sixth Surface (S6)]
ε = 1.00000
A4 = 0.59866 × 10$^{-6}$
A6 = −0.73699 × 10$^{-7}$
A8 = 0.47107 × 10$^{-9}$
A10 = −0.13054 × 10$^{-11}$
[Aspherical Surface Data of the Seventh Surface (S7)]
ε = 1.00000
A4 = −0.65493 × 10$^{-4}$
A6 = 0.58179 × 10$^{-5}$
A8 = 0.63809 × 10$^{-7}$
A10 = −0.14449 × 10$^{-8}$

TABLE 2

<<Example 2>>
Diameter of Pupil = φ7 (mm), Angle of View = 32(°)

| Surface | Radius of Curvature | Axial Distance | Refractive Index | Abbe Number |
|---|---|---|---|---|
| S1 (EP) | r1 = ∞ | | | |
| | | d1 = 25.000 | | |
| S2 (R1) | r2 = ∞ | . . . (Transmissive) | | |
| | | d2 = 2.500 | N1 = 1.51680 | υ1 = 64.20 |
| S3* | r3 = −108.995 | | | |
| | | d3 = 4.000 | | |
| S4 (R2)* | r4 = −40.689 | . . . (Reflective) | | |
| | | d4 = −4.000 | | |
| S5* | r5 = −108.995 | | | |
| | | d5 = −2.500 | N2 = 1.51680 | υ2 = 64.20 |
| S6 (R1) | r6 = ∞ | . . . (Reflective) | | |
| | | d6 = 2.500 | N3 = 1.51680 | υ3 = 64.20 |
| S7* | r7 = −108.995 | | | |
| | | d7 = 4.000 | | |

TABLE 2-continued

<<Example 2>>
Diameter of Pupil = φ7 (mm), Angle of View = 32(°)

| Surface | Radius of Curvature | Axial Distance | Refractive Index | Abbe Number |
|---|---|---|---|---|
| S8 (R2)* | r8 = −40.689 | | ... (Transmissive) | |
| | | d8 = 6.000 | N4 = 1.49140 | υ4 = 57.82 |
| S9 | r9 = 23.396 | | | |

[Aspherical Surface Data of the Third Surface (S3)]
$\epsilon = 1.00000$
$A4 = -0.74599 \times 10^{-4}$
$A6 = 0.20662 \times 10^{-5}$
$A8 = -0.16844 \times 10^{-7}$
$A10 = 0.50982 \times 10^{-10}$

[Aspherical Surface Data of the Fourth Surface (S4) and the Eighth Surface (S8)]
$\epsilon = 1.00000$
$A4 = 0.32069 \times 10^{-4}$
$A6 = -0.72275 \times 10^{-6}$
$A8 = 0.47597 \times 10^{-8}$
$A10 = -0.12507 \times 10^{-10}$

[Aspherical Surface Data of the Fifth Surface (S5) and the Seventh Surface (S7)]
$\epsilon = 1.00000$
$A4 = -0.74599 \times 10^{-4}$
$A6 = 0.20662 \times 10^{-5}$
$A8 = -0.16844 \times 10^{-7}$
$A10 = 0.50982 \times 10^{-10}$

TABLE 3

<<Example 3>>
Diameter of Pupil = φ7 (mm), Angle of View = 32(°)

| Surface | Radius of Curvature | Axial Distance | Refractive Index | Abbe Number |
|---|---|---|---|---|
| S1 (EP) | r1 = ∞ | | | |
| | | d1 = 25.000 | | |
| S2 (R1) | r2 = ∞ | | ... (Transmissive) | |
| | | d2 = 5.000 | N1 = 1.49140 | υ1 = 57.82 |
| S3 (R2)* | r3 = −50.973 | | ... (Reflective) | |
| | | d3 = −5.000 | N2 = 1.49140 | υ2 = 57.82 |
| S4 (R1) | r4 = ∞ | | ... (Reflective) | |
| | | d4 = 5.000 | N3 = 1.49140 | υ3 = 57.82 |
| S5 (R2)* | r5 = −50.973 | | ... (Transmissive) | |
| | | d5 = 2.000 | | |
| S6 | r6 = 21.791 | | | |
| | | d6 = 1.123 | N4 = 1.75000 | υ4 = 25.14 |
| S7 | r7 = 11.339 | | | |

[Aspherical Surface Data of the Third Surface (S3) and the Fifth Surface (S5)]
$\epsilon = 1.00000$
$A4 = 0.45016 \times 10^{-5}$
$A6 = -0.35523 \times 10^{-7}$
$A8 = 0.37691 \times 10^{-9}$
$A10 = -0.12877 \times 10^{-11}$

TABLE 4

<<Example 4>>
Diameter of Pupil = φ6 (mm), Angle of View = 24(°)

| Surface | Radius of Curvature | Axial Distance | Refractive Index | Abbe Number |
|---|---|---|---|---|
| S1 (EP) | r1 = ∞ | | | |
| | | d1 = 12.000 | | |
| S2* | r2 = 59.384 | | | |
| | | d2 = 3.000 | N1 = 1.49140 | υ1 = 57.82 |
| S3 (R1) | r3 = ∞ | | ... (Transmissive) | |
| | | d3 = 4.000 | | |

TABLE 4-continued

<<Example 4>>
Diameter of Pupil = φ6 (mm), Angle of View = 24(°)

| Surface | Radius of Curvature | Axial Distance | Refractive Index | Abbe Number |
|---|---|---|---|---|
| S4 (R2)* | r4 = −24.373 | | ... (Reflective) | |
| | | d4 = −4.000 | | |
| S5 (R1) | r5 = ∞ | | ... (Reflective) | |
| | | d5 = 4.000 | | |
| S6 (R2)* | r6 = −24.373 | | ... (Transmissive) | |
| | | d6 = 5.000 | N2 = 1.58340 | υ2 = 30.23 |
| S7 | r7 = ∞ | | | |

[Aspherical Surface Data of the Second Surface (S2)]
$\epsilon = 1.00000$
$A4 = -0.41243 \times 10^{-4}$
$A6 = -0.29315 \times 10^{-5}$
$A8 = 0.15673 \times 10^{-6}$
$A10 = -0.27763 \times 10^{-8}$

[Aspherical Surface Data of the Fourth Surface (S4) and the Sixth (S6)]
$\epsilon = 1.00000$
$A4 = -0.11396 \times 10^{-4}$
$A6 = -0.71647 \times 10^{-6}$
$A8 = 0.22931 \times 10^{-7}$
$A10 = -0.27297 \times 10^{-9}$

TABLE 5

<<Example 5>>
Diameter of Pupil = φ7 (mm), Angle of View = 32(°)

| Surface | Radius of Curvature | Axial Distance | Refractive Index | Abbe Number |
|---|---|---|---|---|
| S1 (EP) | r1 = ∞ | | | |
| | | d1 = 25.000 | | |
| S2 | r2 = ∞ | | | |
| | | d2 = 3.000 | N1 = 1.51680 | υ1 = 64.20 |
| S3 (R1) | r3 = ∞ | | ... (Transmissive) | |
| | | d3 = 4.000 | | |
| S4 (R2)* | r4 = −30.768 | | ... (Reflective) | |
| | | d4 = −4.000 | | |
| S5 (R1) | r5 = ∞ | | ... (Reflective) | |
| | | d5 = 4.000 | | |
| S6 (R2)* | r6 = −30.768 | | ... (Transmissive) | |
| | | d6 = 5.000 | N2 = 1.49140 | υ2 = 57.82 |
| S7* | r7 = 30.353 | | | |

[Aspherical Surface Data of the Fourth Surface (S4) and the Sixth Surface (S6)]
$\epsilon = 1.00000$
$A4 = -0.30269 \times 10^{-5}$
$A6 = -0.70506 \times 10^{-7}$
$A8 = 0.25012 \times 10^{-9}$
$A10 = -0.96437 \times 10^{-12}$

[Aspherical Surface Data of the Seventh Surface (S7)]
$\epsilon = 1.00000$
$A4 = -0.19741 \times 10^{-3}$
$A6 = 0.46635 \times 10^{-5}$
$A8 = 0.17636 \times 10^{-6}$
$A10 = -0.28127 \times 10^{-8}$

TABLE 6

<Actual Values of Conditions>

| | (3), (3') | (1), (1') | (2) | (4) | Related Data | | |
|---|---|---|---|---|---|---|---|
| Example | fs/f1 | fs/f2 | CRs/fs | vd | fs | f1 | f2 | CRs |
| 1 | 0.336 | −0.391 | −2.198 | 30.23 | 19.0 | 56.58 | −46.58 | −41.76 |
| 2 | 0.091 | −0.648 | −2.142 | 57.82 | 19.0 | 210.90 | −29.32 | −40.69 |
| 3 | 0.490 | −0.575 | −2.683 | 25.14 | 19.0 | 25.49 | −33.04 | −50.97 |
| 4 | 0.158 | −0.299 | −1.950 | 30.23 | 12.5 | 120.49 | −41.78 | −24.37 |
| 5 | 0.000 | −0.627 | −1.619 | 57.82 | 19.0 | ∞ | −30.28 | −30.77 |

What is claimed is:

1. An eyepiece optical system for projecting an enlarged virtual image of a two-dimensional image on an observer's pupil, comprising, from the observer's pupil side:
   a first reflective/transmissive surface formed as a flat surface;
   a second reflective/transmissive surface so shaped as to be concave to the pupil side; and
   a negative-powered optical element having a negative power and arranged between the second reflective/transmissive surface and the two-dimensional image,
   wherein the following conditions are fulfilled:

$-1.0 < fs/f2 < -0.1$ $vd < 60$ where
   f2 represents a focal length of the negative-powered optical element;
   fs represents a focal length of the entire eyepiece optical system; and
   vd represents an Abbe number of the negative-powered optical element.

2. An eyepiece optical system as claimed in claim 1, wherein the second reflective/transmissive surface fulfills the following condition:

$-4.0 < CRs/fs < -0.8$ where
   CRs represents a radius of curvature of the second reflective/transmissive surface.

3. An eyepiece optical system as claimed in claim 1, wherein a positive-powered optical element is provided on the observer's pupil side of the first reflective/transmissive surface.

4. An eyepiece optical system as claimed in claim 3, wherein the positive-powered optical element fulfills the following condition:

$0 \leq fs/f1 < 1.0$ where
   f1 represents a focal length of the positive-powered optical element.

5. An eyepiece optical system as claimed in claim 1, wherein the negative-powered optical element fulfills the following condition:

$vd < 35$ where
   vd represents an Abbe number of the negative-powered optical element.

6. An eyepiece optical element as claimed in claim 1, wherein the second reflective/transmissive surface is included in the negative-powered optical element.

7. An eyepiece optical element as claimed in claim 1, wherein the second reflective/transmissive surface is included in a positive-powered optical element.

8. An eyepiece optical element as claimed in claim 1, wherein the first reflective/transmissive surface is included in a positive-powered optical element.

9. An eyepiece optical element as claimed in claim 1, wherein the second reflective/transmissive surface is concave.

10. An eyepiece optical element as claimed in claim 9, wherein the second reflective/transmissive surface is aspherical.

11. An eyepiece optical element as claimed in claim 10, wherein the eyepiece optical system includes an optical element formed from plastic.

12. An image display apparatus comprising:
    an image display device for displaying a two-dimensional image; and
    an eyepiece optical system for projecting an enlarged virtual image of the two-dimensional image on an observer's pupil, the eyepiece optical system comprising, from the observer's pupil side:
    a first reflective/transmissive surface formed as a flat surface;
    a second reflective/transmissive surface so shaped as to be concave to the pupil side; and
    a negative-powered optical element having a negative power and arranged between the second reflective/transmissive surface and the two-dimensional image,
    wherein the eyepiece optical system fulfills the following conditions:

$-1.0 < fs/f2 < -0.1$ $vd < 60$ where
    f2 represents a focal length of the negative-powered optical element;
    fs represents a focal length of the entire eyepiece optical system; and
    vd represents an Abbe number of the negative-powered optical element.

13. An image display apparatus as claimed in claim 12, wherein the image display device is a transmission-type liquid crystal display device.

14. An image display apparatus as claimed in claim 12, wherein the image display device is a reflection-type liquid crystal display device.

15. An eyepiece optical system for projecting an enlarged virtual image of a two-dimensional image on an observer's pupil, comprising, from the observer's pupil side:

a first reflective/transmissive surface formed as a flat surface;

a second reflective/transmissive surface so shaped as to be concave to the pupil side; and a negative-powered optical element having a negative power and arranged between the second reflective/transmissive surface and the two-dimensional image, wherein the second reflective/transmissive surface is integrally formed at a most pupil side surface of the negative-powered optical element, wherein the following condition is fulfilled:

$$-1.0 < fs/f2 < -0.1$$

where f2 represents a focal length of the negative-powered optical element; and fs represents a focal length of the entire eyepiece optical system.

16. An eyepiece optical system as claimed in claim 15, wherein the second reflective/transmissive surface fulfills the following condition:

$$-4.0 < CRs/fs < -0.8$$

where

CRs represents a radius of curvature of the second reflective/transmissive surface.

17. An eyepiece optical system as claimed in claim 15, wherein a positive-powered optical element is provided on the observer's pupil side of the first reflective/transmissive surface.

18. An eyepiece optical system as claimed in claim 17, wherein the positive-powered optical element fulfills the following condition:

$$0 \leq fs/f1 < 1.0$$

where f1 represents a focal length of the positive-powered optical element.

19. An eyepiece optical system as claimed in claim 15, wherein the negative-powered optical element fulfills the following condition:

$$vd < 35$$

where vd represents an Abbe number of the negative-powered optical element.

20. An eyepiece optical element as claimed in claim 15, wherein the second reflective/transmissive surface is included in the negative-powered optical element.

21. An eyepiece optical element as claimed in claim 15, wherein the second reflective/transmissive surface is included in a positive-powered optical element.

22. An eyepiece optical element as claimed in claim 15, wherein the first reflective/transmissive surface is included in a positive-powered optical element.

23. An eyepiece optical element as claimed in claim 15, wherein the second reflective/transmissive surface is concave.

24. An eyepiece optical element as claimed in claim 23, wherein the second reflective/transmissive surface is aspherical.

25. An eyepiece optical element as claimed in claim 24, wherein the eyepiece optical system includes an optical element formed from plastic.

26. An image display apparatus comprising:

an image display device for displaying a two-dimensional image; and an eyepiece optical system for projecting an enlarged virtual image of a two-dimensional image on an observer's pupil, in accordance with claim 15.

27. An image display apparatus as claimed in claim 26, wherein the image display device is a transmission-type liquid crystal display device.

28. An image display apparatus as claimed in claim 26, wherein the image display device is a reflection-type liquid crystal display device.

* * * * *